(12) United States Patent
McBeth

(10) Patent No.: US 10,671,237 B2
(45) Date of Patent: Jun. 2, 2020

(54) HUMAN-MACHINE INTERFACE FOR PRESENTING A USER INTERFACE ON A VIRTUAL CURVED VISUAL SURFACE

(71) Applicant: Microsoft Technology Licensing, LLC, Redmond, WA (US)

(72) Inventor: Sean Kenneth McBeth, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 15/785,345

(22) Filed: Oct. 16, 2017

(65) Prior Publication Data
US 2019/0114051 A1 Apr. 18, 2019

(51) Int. Cl.
| | | |
|---|---|---|
| *G06F 3/0481* | (2013.01) | |
| *G06F 3/0484* | (2013.01) | |
| *G06T 19/00* | (2011.01) | |
| *G06F 9/451* | (2018.01) | |
| *G06F 3/01* | (2006.01) | |
| *G06F 3/0485* | (2013.01) | |

(Continued)

(52) U.S. Cl.
CPC ....... *G06F 3/04815* (2013.01); *G02B 27/017* (2013.01); *G06F 3/011* (2013.01); *G06F 3/013* (2013.01); *G06F 3/017* (2013.01); *G06F 3/0481* (2013.01); *G06F 3/0482* (2013.01); *G06F 3/0485* (2013.01); *G06F 3/04845* (2013.01); *G06F 9/451* (2018.02); *G06T 19/006* (2013.01); *G02B 2027/014* (2013.01); *G02B 2027/0134* (2013.01); *G02B 2027/0187* (2013.01)

(58) Field of Classification Search
CPC .... G06F 3/0485; G06F 3/011; G06F 3/04815; G06F 3/0482
See application file for complete search history.

(56) References Cited

U.S. PATENT DOCUMENTS

| 8,140,996 B2* | 3/2012 | Tomkins | G06F 3/0485 715/730 |
|---|---|---|---|
| 2008/0122870 A1* | 5/2008 | Brodersen | G06F 3/0482 345/634 |

(Continued)

FOREIGN PATENT DOCUMENTS

CN 105955454 A 9/2016

OTHER PUBLICATIONS

"International Search Report and Written Opinion issued in PCT Application No. PCT/US2018/054899", dated Dec. 21, 2018, 15 Pages.

(Continued)

*Primary Examiner* — Nicholas Ulrich
(74) *Attorney, Agent, or Firm* — Newport IP, LLC; Michael C. Johnson; Vernon W. Francissen

(57) ABSTRACT

Technologies are disclosed for presenting a user interface ("UI") in a three dimensional virtual environment that involves positioning one or more UI elements at first locations on a curved surface in the virtual environment, where the one or more UI elements are tangential to the curved surface. The curved surface is defined by a first distance to a reference point. The disclosed technologies also involve, for at least one of the UI elements, computing a second location for the UI element on the curved surface and moving the UI element to the second location on the curved surface.

19 Claims, 12 Drawing Sheets

(51) Int. Cl.
*G06F 3/0482* (2013.01)
*G02B 27/01* (2006.01)

(56) References Cited

U.S. PATENT DOCUMENTS

| | | | | |
|---|---|---|---|---|
| 2012/0047465 | A1* | 2/2012 | Noda | G06F 3/011 |
| | | | | 715/848 |
| 2013/0246967 | A1* | 9/2013 | Wheeler | G06F 3/012 |
| | | | | 715/784 |
| 2013/0332871 | A1* | 12/2013 | Bucur | G06T 19/00 |
| | | | | 715/768 |
| 2014/0347391 | A1 | 11/2014 | Keane et al. | |
| 2015/0016777 | A1 | 1/2015 | Abovitz et al. | |
| 2015/0138081 | A1* | 5/2015 | Iwatsu | G06F 3/012 |
| | | | | 345/157 |
| 2015/0309310 | A1 | 10/2015 | Cho et al. | |
| 2016/0063762 | A1* | 3/2016 | Heuvel | G06F 3/011 |
| | | | | 345/633 |
| 2017/0185261 | A1* | 6/2017 | Perez | G06F 3/04815 |
| 2017/0300113 | A1* | 10/2017 | Han | G06F 3/013 |
| 2017/0371523 | A1* | 12/2017 | Liao | G06F 3/04845 |
| 2018/0004391 | A1* | 1/2018 | Rao | G06F 3/0482 |

OTHER PUBLICATIONS

"Curved UI—VR Ready Solution To Send / Warp Your Canvas!", Retrieved From <<https://www.assetstore.unity3d.com/en/#!/content/53258>>, Jan. 14, 2016, 3 Pages.

Aitchison, Alastair., "Animal Crossing Curved World Shader", Retrieved From <<https://alastaira.wordpress.com/2013/10/25/animal-crossing-curved-world-shader/>>, Oct. 25, 2013, 17 Pages.

* cited by examiner

HUMAN-MACHINE INTERFACE FOR PRESENTING A USER INTERFACE ON A VIRTUAL CURVED VISUAL SURFACE

BACKGROUND

At present, there are a growing number of fields for mixed and virtual reality headsets that allow a user to visualize holographic or augmented images that are combined with the real-world physical environment to create a mixed reality environment. These fields include, for example, scientific visualization, medicine and military training, engineering design and prototyping, tele-manipulation and telepresence, and personal entertainment systems.

There are also many applications for virtual reality ("VR") systems that allow a user to visualize computer generated holographic images in a virtual environment. Unlike mixed reality systems, in VR systems, VR headsets usually have opaque displays where computer-generated images, objects, or virtual scenes are displayed on the opaque displays while concurrently not allowing visualization of the outside real-world physical environment.

Conversely, mixed reality systems (also known as augmented reality "AR" systems) usually have transparent displays that allow visualization of the outside real-world physical environment while concurrently displaying computer-generated holographic images, e.g. augmented images. In other words, a mixed reality headset includes a transparent display that allows a user to see through the transparent display to the outside real-world physical environment while simultaneously seeing computer-generated holographic on the transparent display, which are combined with the real-world physical environment to form a combined visual environment, e.g. augmented images, in the field of view of the user. The combined visual environment includes both the real-world physical environment and the holographic or augmented images. An example of a mixed reality headset is a Near-Eye-Display ("NED") system that superimposes computer-generated images ("CG images") over a user's view of a real-world environment.

SUMMARY

Disclosed are technologies for presenting a user interface ("UI") in a three dimensional ("3D") virtual environment. These technologies include presentation of a UI with a set of UI elements in the 3D virtual environment. The 3D virtual environment includes a curved visual surface (which might also be referred to herein as a "curved surface") that has a horizontal curved axis, a vertical axis and a reference point. For at least one UI element, a first position is determined for the UI element on the horizontal curved axis and the vertical axis of the curved visual surface. A rotation on the vertical axis is determined for the UI element based on the first position of the UI element along the horizontal axis relative to a reference position, such that the UI element can be rotated toward the reference point. The UI element is rotated on the vertical axis and the rotated UI element is rendered at the first position on the curved visual surface.

In an example of operation, user input to the UI is detected requesting movement of UI elements. For at least one UI element, a target position on the curved visual surface is determined for the UI element based on the user input, and a rotation of the UI element around the vertical axis is determined based on the target position. The UI element is moved to the target position on the curved visual surface rotated on the vertical axis to the rotation determined based on the target position.

Also disclosed are technologies for presenting a UI in a 3D virtual environment that involves positioning one or more UI elements at first locations on a curved surface in the virtual environment, where the one or more UI elements are tangential to the curved surface and the curved surface is defined by a first distance to a reference point. For at least one of the UI elements, a second location for the UI element is computed on the curved surface, and the UI element is moved to the second location on the curved surface. The technologies disclosed herein help to reduce or eliminate some of the hit detection issues due to the discrepancy between the apparent and actual position of a UI element without needing to perform the computation for input mapping of user input in 3D space to a curved visual surface.

Other devices, apparatus, systems, methods, features, advantages, and technical benefits of the disclosed technologies will be or will become apparent to one with skill in the art upon examination of the following figures and detailed description. It is intended that all such additional systems, methods, features, advantages, and technical benefits be included within this description, be within the scope of the disclosed technologies, and be protected by the accompanying claims.

BRIEF DESCRIPTION OF THE FIGURES

The disclosed technologies may be better understood by referring to the following figures. The components in the figures are not necessarily to scale, emphasis instead being placed upon illustrating the principles of the disclosed technologies. In the figures, like reference numerals designate corresponding parts throughout the different views.

DETAILED DESCRIPTION

Figure 1A:
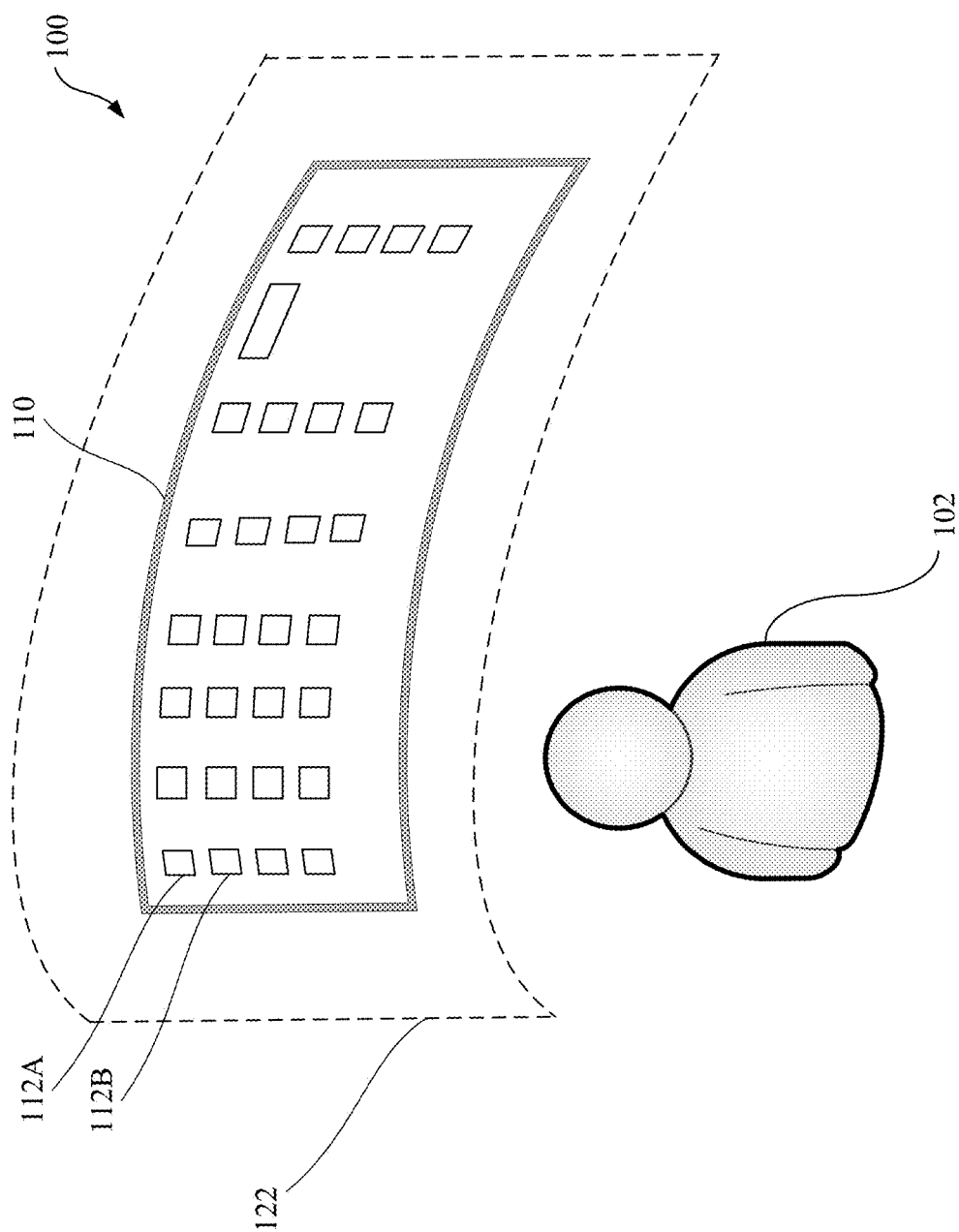
FIG. 1A is a schematic view illustrating a user interface displayed on a cylindrically curved visual surface.

Technologies for presenting and interacting with a UI in a three dimensional virtual environment are disclosed. In the disclosed technologies, the transformation of a collider component of a UI element onto a curved visual surface improves the appearance of visual components of UI elements.

In the disclosed technologies, the visual appearance of the visual components of UI elements may be improved by being oriented toward a reference point coinciding with a user view point. Further, the transformation of a collider component of a UI element onto a curved visual surface in the three dimensional virtual environment reduces the potential discrepancy between the apparent position in three dimensional space of a visual component of a UI element and the collider component resulting in improved function of the UI, such as by reducing erroneous user input thereby saving processor cycles and other computing resources. Also, computationally expensive mapping calculations to map user inputs from a curved visual surface to a flat UI are not required because the UI elements, including the collider components, are transformed onto the curved visual surface such that the visual and collider components are positioned in substantially the same three-dimensional space location.

In the disclosed technologies, a UI has a set of UI elements, and the three dimensional virtual environment includes a curved visual surface with a first curved axis (e.g. a curved horizontal axis), a second axis (e.g. a vertical axis), and a reference point. The disclosed technologies include, for at least one UI element, determining a first position for the UI element on the first curved axis of the curved visual surface and a second axis of the curved visual surface, and determining a second axis of rotation of the UI element with respect to the second axis based on the first position along the first curved axis. The disclosed technologies also involve rotating the UI element on the second axis to the determined second axis rotation, and rendering the rotated UI element at the first position on the curved visual surface. Another way to look at it is that a UI element is rotated around a user's viewing position or center point to determine its position on the curved horizontal axis so that the UI element is turned towards the user's viewing position.

In an example of operation, the disclosed technologies further involve detecting user input to the UI requesting movement of at least one UI element. For the at least one UI element, the disclosed technologies includes determining a target position for the UI element on the curved visual surface based on the user input, and determining a target rotation for the UI element around the second axis based on the target position. This example further includes moving the UI element to the target position on the curved visual surface, and rotating the UI element to the target rotation.

Another example of an approach to presenting a UI in a three dimensional virtual environment is disclosed that involves positioning one or more UI elements at first locations on a curved surface in the virtual environment, where the one or more UI elements are tangential to the curved surface, and the curved surface is defined by a first distance to a reference point. This example also involves, for at least one UI element, computing a second location for the UI element on the curved surface, and moving the UI element to the second location on the curved surface.

UI elements may be placed on a cylindrical curve by changing a horizontal axis, e.g. x-axis, placement of the UI element while maintaining a vertical axis, e.g. y-axis, that is the same as for a flat UI. This change may be a vertical axis rotation around a center point. The center point may be the intended position of the user's viewpoint, and would stay the same for all of the UI elements on the curved visual surface. Each UI element has a rotation corresponding to its differentiated horizontal placement on the curved surface.

One example of a CG image that may be produced by a NED system is a user interface ("UI") presented to a user of a NED system. FIG. 1A is a schematic diagram illustrating a mixed reality environment 100, wherein a user 102 wearing a NED headset, such as the one illustrated in FIG. 7 discussed below, is presented with a UI 110 presented on a cylindrically curved visual surface 122 within the mixed reality environment. The curved visual surface is a virtual construct generated by the NED system for presenting CG images to the user. The UI 110, in this example, includes multiple UI elements, such as UI elements 112A and 112B, presented in the mixed reality environment 100, which may be viewed and interacted with by the user 102.

Figure 1B:
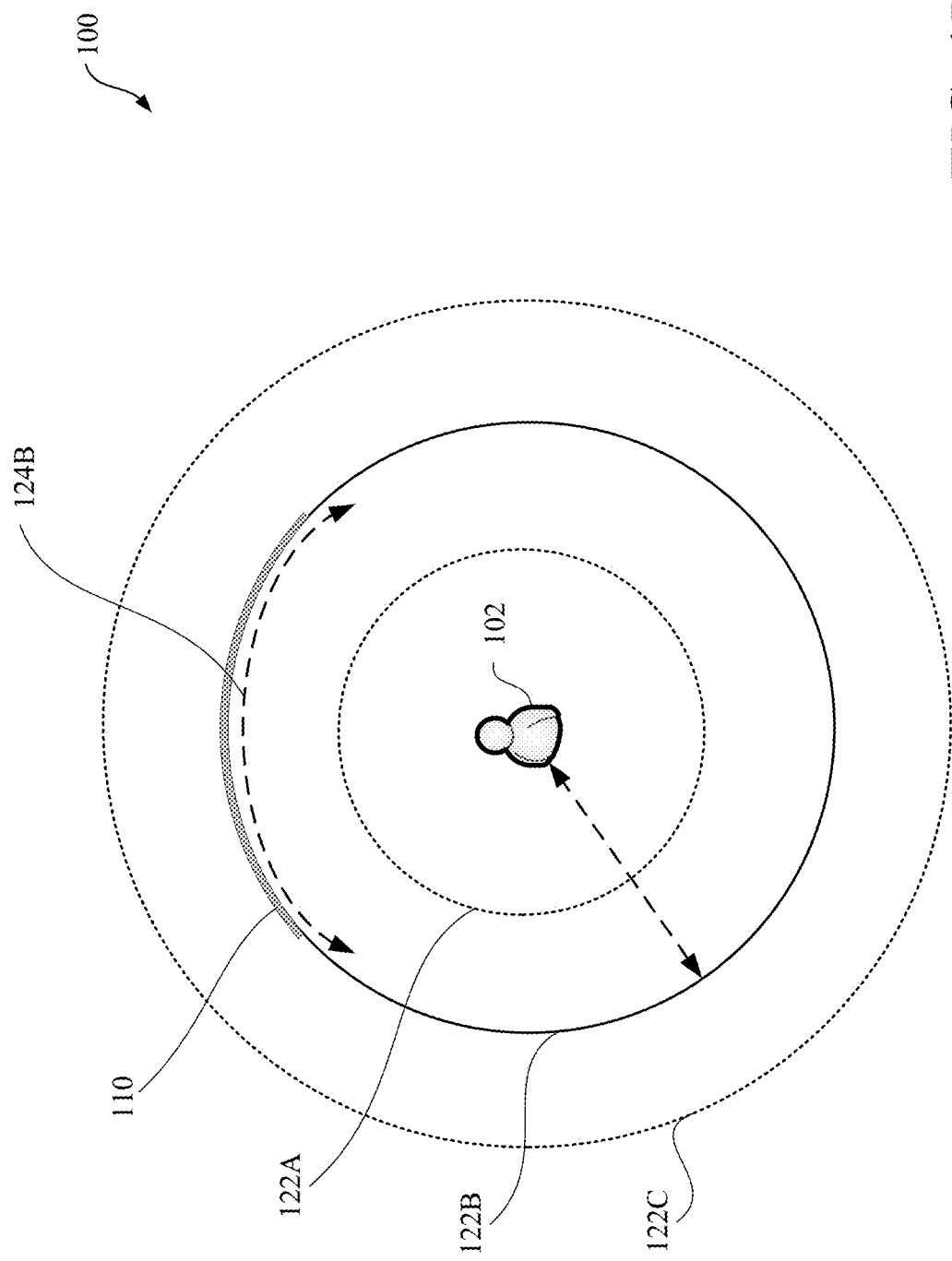
FIG. 1B is a schematic view further illustrating aspects of the curved visual surface of FIG. 1A.

Conventionally, flat user interfaces are often projected onto a curved visual surface, such as surface 122B shown in FIG. 1B, for presentation to a user 102. However, when a flat user interface is projected onto a curved visual surface of virtual space, a discrepancy may arise between the apparent position of a user interface element and the position of an interactive portion of the user interface element. This discrepancy may result in incorrect or inadvertent UI input by a user, which results in unnecessary use of computing resources, such as processor cycles. One solution to resolving hit detection issues due to the discrepancy between the apparent and actual position of a user interface element is to perform input mapping that maps user input in three dimensional space onto the curved visual surface. However, mapping adds additional complexity and may impact performance due to the computing resources, such as processor cycles and memory, required to perform the mapping. In addition, some user interface elements, such as spatial sound and visual effects or debugging information, require accurate three dimensional coordinates, which also requires mapping from the curved visual surface to real-world coordinates. The rendering indirection and back and forth for such elements also creates additional complexity and might also negatively impact computing system performance.

FIG. 1B is a schematic diagram illustrating the mixed reality environment 100 of FIG. 1A with examples of cylindrically curved visual surfaces 122A, 122B and 122C at different distances from the user 102 wearing a NED system. In this example, the UI 110 is disposed on curved visual surface 122B at a known distance from user 102, and provides for lateral movement of the elements of the user interface along a curved x-axis 124B of curved visual surface 122B. In the example shown, UI 110 includes a display space that spans approximately 90° of the user's field of vision.

Figure 2A:
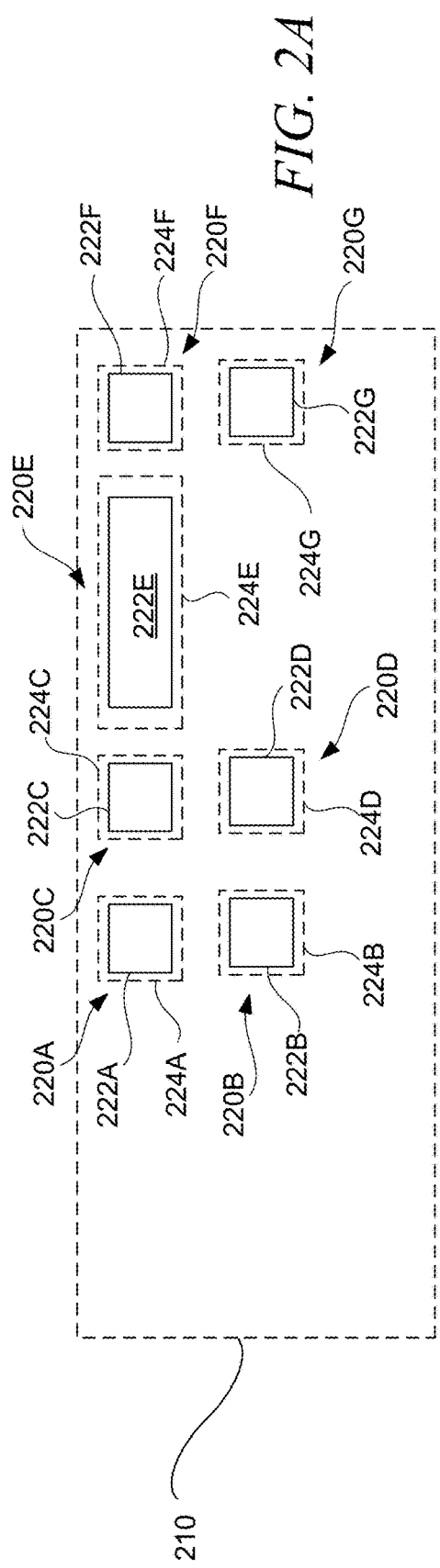
FIG. 2A is a schematic view illustrating details of an example of a flat user interface.
Figure 2B:
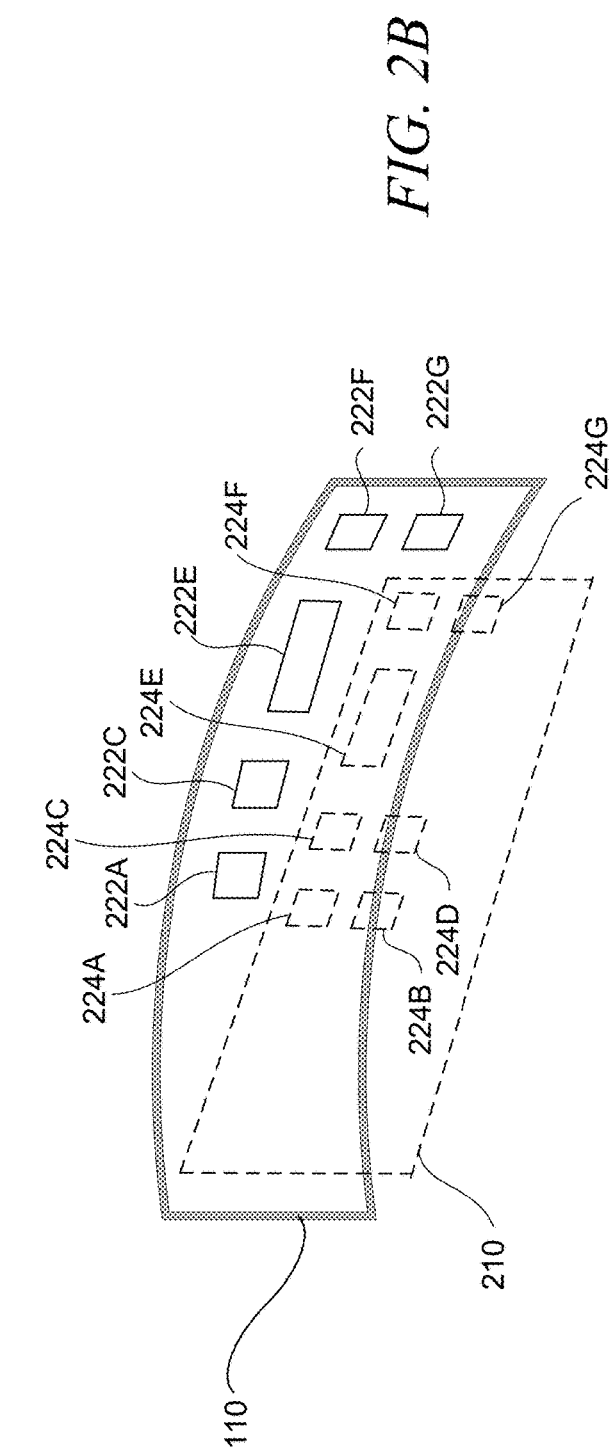
FIG. 2B is a schematic view illustrating an example of one problem encountered with displaying the flat user interface of FIG. 2A on the curved visual surface of FIG. 1A.

FIGS. 2A and 2B illustrate an example of the discrepancy between the apparent position of a user interface element and the position of the interactive portion of the user interface element that may arise when a flat user interface is projected onto a curved visual surface of virtual space, a discrepancy may arise. FIG. 2A is a schematic diagram illustrating an example of a flat user interface 210, which includes individual user interface elements, such as elements 220A, 220B, 220C, 220D, 220E, 220F and 220G (which may be referred to collectively as "the UI elements 220"). Individual UI elements 220 often include both a visible portion, which is an image that is displayed to the user, and an interactive element, such as a "collider," which a user will contact in virtual space to interact with the user element. For example, user interface element 220A includes visible element 222A and interactive element 224A, which surrounds visible element 222A on the flat user interface 210. When a user attempts to "touch" the visible element 222A, the user will encounter the collider of interactive element 224A, which the computing system presenting the UI 210 will register as an activation of user interface element 220A.

FIG. 2B is a schematic diagram illustrating an example of a flat user interface being projected onto a curved visual surface. In the example shown, the visible portions of the individual user interface elements appear to the user to be positioned in 3D space on user interface display area 110 on a curved visual surface while the interactive UI elements of flat user interface 210 remain in their respective positions in three dimensional space determined by their relative positions as defined by flat user interface 210. For example, the visible element 222A of user interface element 220A will appear to the user to be in a different position in three dimensional space than the interactive element 224A. As a result, a user attempting to interact with the visible element 222A may fail to intersect interactive element 224A or may intersect with the interactive element of a different user interface element, e.g. interactive element 224B of user interface element 220B.

Figure 3A:
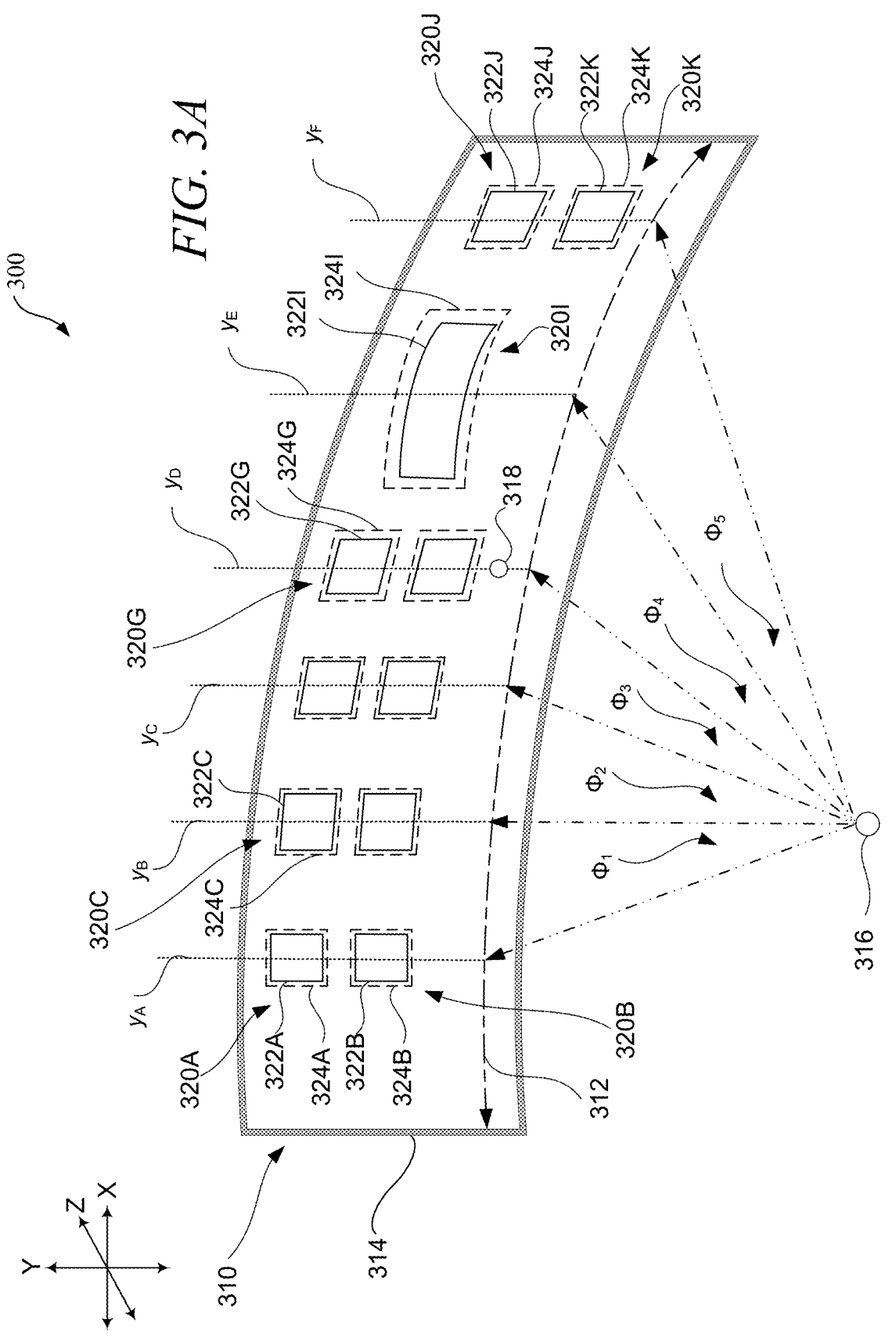
FIG. 3A is a schematic view illustrating an example of a user interface displayed on a curved visual surface in accordance with the present disclosure.

FIG. 3A is a schematic view illustrating an example 300 of an implementation of a user interface 310 displayed on a cylindrically curved visual surface, such as curved visual surface 122B in FIG. 1B, in accordance with the present disclosure. In this example, a flat UI, such as UI 210 in FIG. 2A is transformed to a curved visual surface, as described below. In FIG. 3A, UI 310 has a display area 314 that is curved along a curved x-axis 312 of the cylindrically curved visual surface generally oriented toward reference point 316, which may be a center point or focal point of the curved visual surface and may be the viewing point of a user. A reference point 318 on the curved visual surface is also shown, which may correspond to a central portion of the UI 310. UI 310 includes multiple UI elements, which include elements 320A, 320B, 320C, 320G, 320I, 320J and 320K, that are visible within the display area 314.

In the example 300 of FIG. 3A, the UI elements are positioned on the curved visual surface at different positions along the curved x-axis 312, which are angled or displaced with respect to the reference point 316 as indicated by angles Φ1, Φ2, Φ3, Φ4, and Φ5. The UI elements are rotated about the y-axis of the curved visual surface at the positions along the x-axis. For example, UI elements 320A and 320B are rotated on y-axis yA to be oriented toward reference point 316. In one implementation, the UI elements 320 are rotated tangentially to the curve of the curved visual surface at each position. For example, UI element 320I is rotated based on the angle of displacement 14 from reference point 318. In another implementation, the UI elements 320 are rotated based on their rotational displacement along the x-axis 312, such as the angular displacement from reference point 318.

The UI elements 320 shown in FIG. 3A each include a visual component 322, which is visible to a user, and a collider component 324 with which the user interacts in three dimensional space in order to select or activate the UI element. For example, UI element 320J includes visual component 322J and collider component 324J. For some UI elements, particularly a longer or larger UI element such as UI element 320I, the UI element itself may be curved to more closely conform to the curved visual surface upon which the UI element is rendered.

In order to activate UI 320J, for example, a user reaches toward the display of visual component 322J of UI element 320J and intersects collider 324J. Typically, a collider component is slightly larger than the visual component to facilitate intersection with the user. In one example of an activation scenario, the user reaches their hand towards the visual component 322, encounters the collider component 324, and makes a pinching motion to access a next level of the UI element, e.g. open a file or link associated with the UI element. Note that some UI elements may not have a collider element, such as a fixed or passive visual UI element, e.g. a title or background image.

The resulting rotation of UI elements 320 toward the reference point 316, which generally coincides with a user's viewpoint, may provide several improvements. For example, the visual appearance of the visual components 322 of the UI elements may be improved by being oriented toward the reference point. Further, the transformation of the collider component 324 onto the curved visual surface reduces the potential discrepancy between the apparent position in three dimensional space of visual component of a UI element and the collider component resulting in improved function of the UI 310, such as by reducing erroneous user input thereby saving processor cycles and other computing resources. Also, computationally expensive mapping calculations to map user inputs from a curved visual surface to a flat UI are not required because the UI elements 320, including the collider components 324, are transformed onto the curved visual surface such that the visual and collider components are positioned in substantially the same three-dimensional space location. Other technical benefits not specifically disclosed herein may be realized through various implementations of the disclosed technologies.

Note that horizontal rotation or scrolling of the elements of a UI may be implemented by placing all of the UI element objects that are intended to be scrolled together as children of a parent transform. The position of this parent object may vary, but is preferably close to the average position of the scrollable UI elements for simplicity and avoidance of floating point error. The parent transform can then be rotated or scrolled horizontally around the center point 316.

Figure 3B:
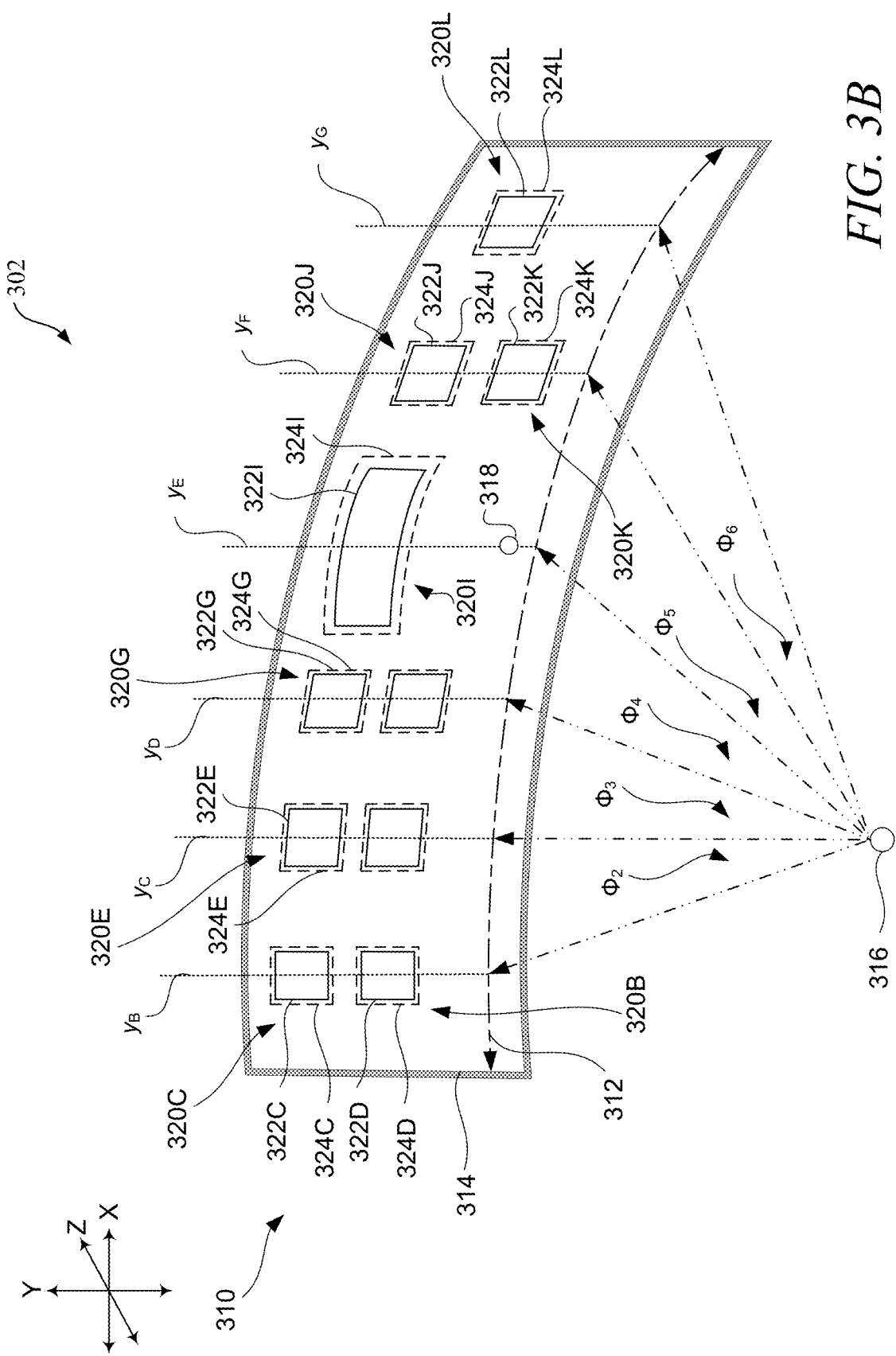
FIG. 3B is a schematic view illustrating an example of the user interface display of FIG. 3A after rotation by a user in accordance with the present disclosure.

FIG. 3B is a schematic view illustrating an example of the user interface display of FIG. 3A after counterclockwise rotation or scrolling by a user in accordance with the present disclosure. In this example, user input was received requesting a counterclockwise rotation of the UI elements 320 along curved x-axis 312 within the display area 314 of UI 310. The user input resulted in UI elements 320A and 320B being moved beyond the leftmost limit of the display area 314 of UI 310 and UI element 320L being moved into the display area 314 from the rightmost limit of the display area 314.

In addition, as the UI elements 320 were moved from their initial location along curved x-axis 312 to their target location, they were rotated on the y-axis from their initial rotation to a y-axis rotation based on their target location. For example, UI elements 320C and 320D were further rotated on y-axis yB toward reference point 316 as they were moved to their target location along x-axis 312. In one implementation, the UI elements 320 are rotated to be tangential to the curved visual surface. In another implementation, a y-axis rotation is calculated for the target position of the UI element 320 based on the user input, and the UI element 320 is gradually rotated toward its target rotation as the UI element is moved toward its target location, such as a rotation of UI element 320C on axis yB in the UI movement illustrated in FIG. 3B.

Note that the movement of UI elements 320 from their initial location to their target location may include acceleration from the initial location and a deceleration as the UI element nears the target location. For example, the movement of a UI element 320 may accelerate from the initial location until a midpoint is reached between the initial and target locations, a defined or calculated acceleration distance from the initial location is reached, or until a defined maximum rate of movement is reached. Similarly, the movement of the UI element 320 may decelerate from the midpoint between the initial and target locations, a defined or calculated deceleration distance from the target location is reached, or once the defined maximum rate of movement is reached. Acceleration and deceleration techniques other than those listed here may be utilized without departing from the teachings of this disclosure.

Further note that the rotation of UI elements 320 from their initial rotation to their target rotation may include acceleration from the initial rotation and deceleration as the UI element nears the target rotation. The rotational acceleration and deceleration may correspond to or follow techniques similar to the movement acceleration and deceleration described above.

Note that rotation or scrolling of UI elements may result in UI elements leaving the bounds of the UI display area 314 or scrollable container. In this situation, the UI elements that are beyond the bounds of the UI display area may be masked to hide the UI elements fully or partially as they move out of the UI display area or container. Once the UI elements are fully outside the display area, they may be disabled from being shown in the virtual environment to prevent them from being seen as wrapping around the user, e.g. such as a 360 degree UI caused by a long list of UI elements, and to save on performance.

To prevent this type of wrap-around, in some implementations, the UI elements 320, such as elements 320A and 320B, that are no longer positioned within display area 314 are prevented from being displayed. The non-displayed UI elements may also be disabled, and the collider elements 324A and 324B may be inhibited so that no user input is registered with respect to the non-visible elements. Thus, the efficiency of the UI 310 is improved because computer resources are not devoted to presenting UI elements outside the display area 312.

UI elements, such as UI element 320L, that enter display area 314 due to user input are processed as described above to transform the UI element onto the curved visual surface such that the UI element is oriented toward the reference point 316. If the UI element includes a collider component 324, such as collier element 324L, then the collider component is activated so that user input involving the UI element may be registered.

Figure 4A:
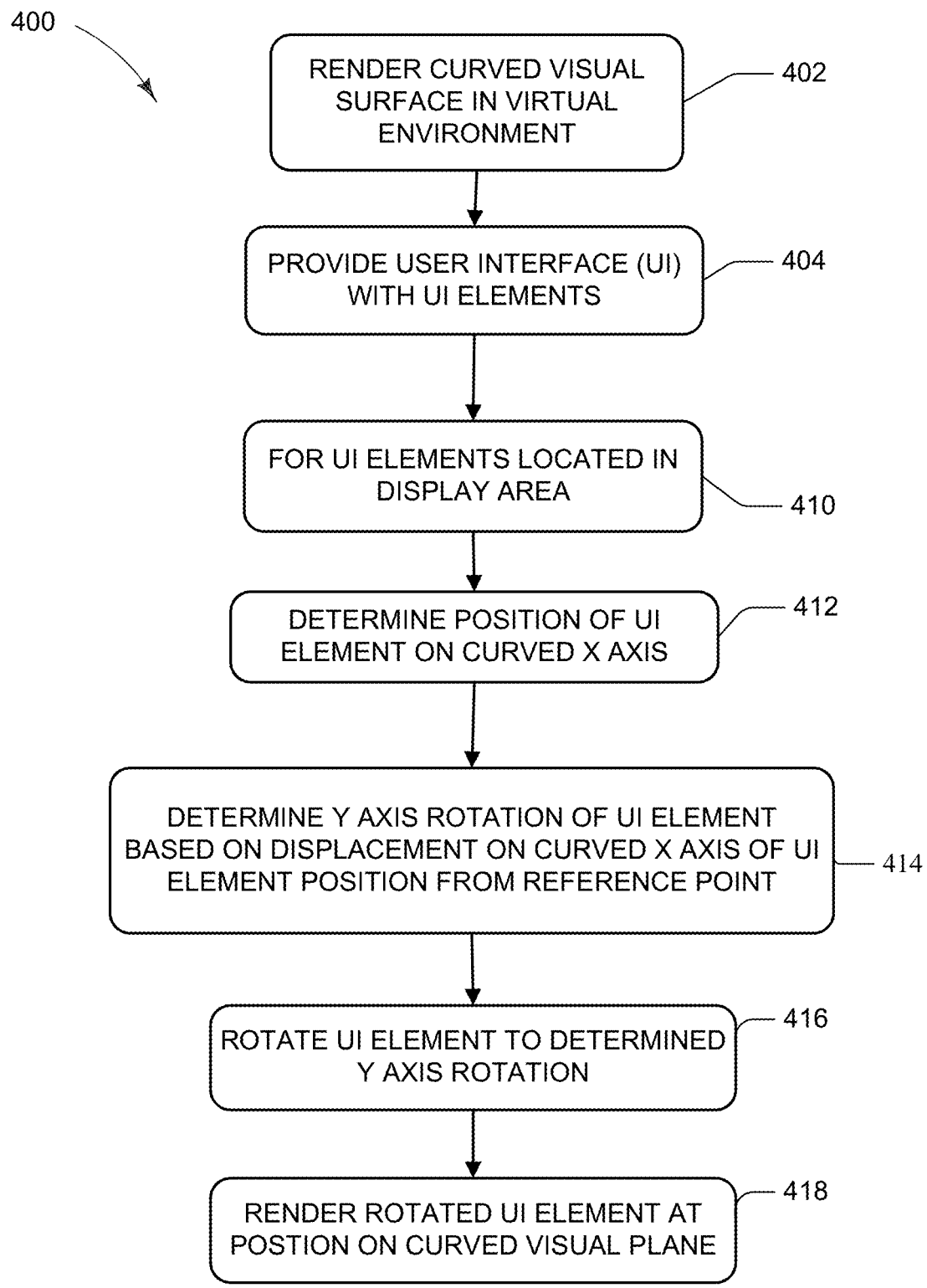
FIG. 4A is a flowchart illustrating an example of an implementation of an approach to displaying a user interface on a curved visual surface in accordance with the present disclosure.

FIG. 4A is a flowchart illustrating an example of a process 400 implementing an approach to displaying a user interface on a curved visual surface in accordance with the present disclosure. In process 400, at operation 402, a curved visual surface, such as the cylindrical surfaces 122A, 122B or 122C illustrated in FIG. 1B, is rendered in a three dimensional environment, such as a virtual or mixed reality environment. Examples of a curved visual surface include a wireframe mesh three dimensional model for computer graphics or similar mathematical representation of a surface in three dimensions.

At 404, a user interface with UI elements, such as the UI 210 in FIG. 2A, with UI elements 220 is provided for rendering or transformation to the curved visual surface in the three dimensional environment. At 410, for UI elements 320 located in a display area of the UI, such as display area 314 of UI 310 in FIG. 3A, a first location is determined, at operation 412, for the UI element on the curved x-axis 312.

At operation 414, a y-axis rotation for the UI element 320 is determined based on the displacement of the UI element on the curved x-axis from a reference point, such as reference point 318 or other reference, such as an angle with respect to reference point 316. At operation 416, the UI element is rotated to the y-axis rotation that was determined for the UI element 320 and, at 418, the rotated UI element is rendered or transformed onto the curved visual surface. As a result, the UI elements 320 of UI 310 are oriented toward reference point 316 for presentation to a user, and both the visual 322 and collider 324 components of the user elements are transformed to the same location in three dimensional space.

Figure 4B:
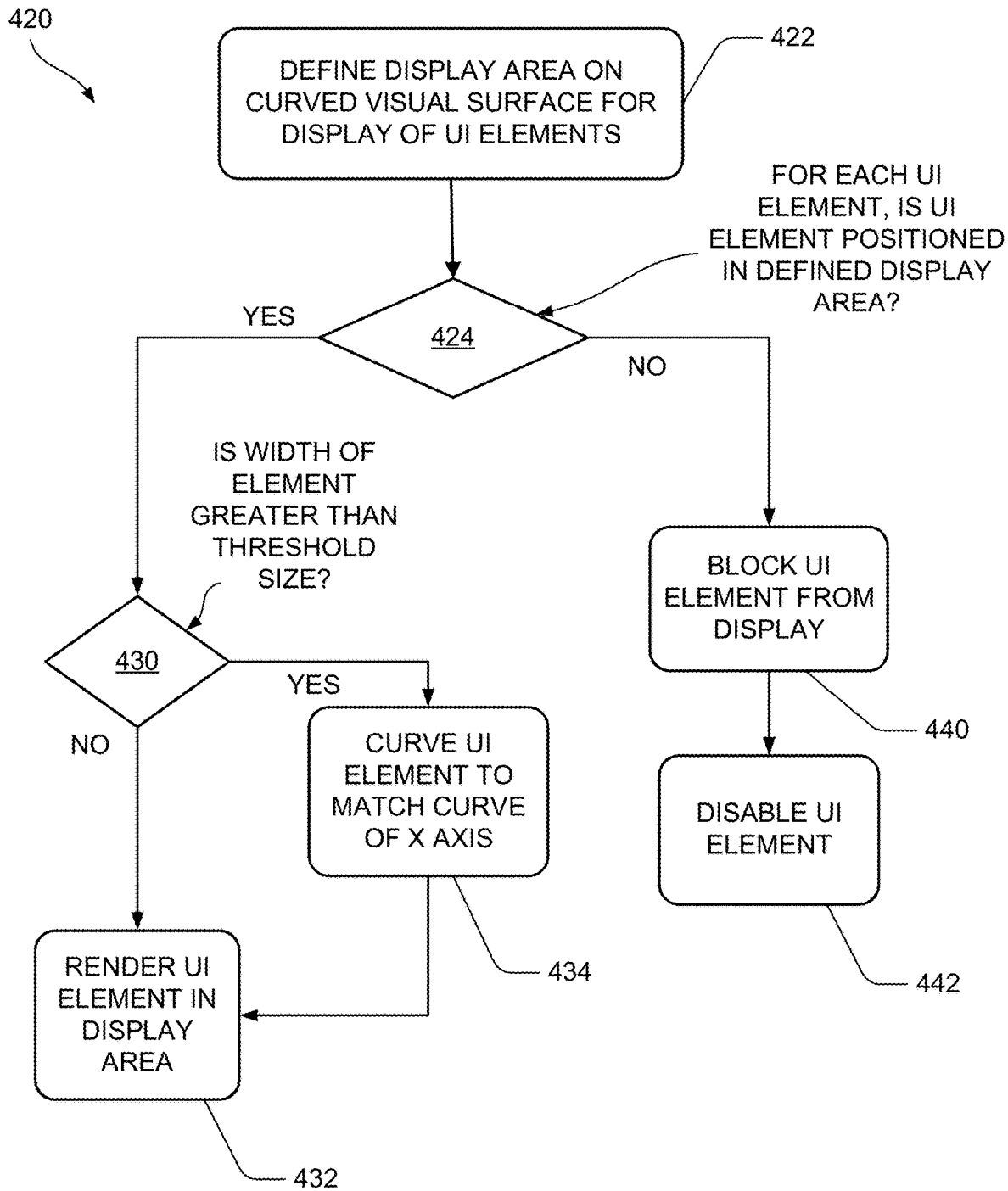
FIG. 4B is a flowchart illustrating another example of an implementation of certain aspects relating to handling non-displayed user interface elements in accordance with the present disclosure.

As noted above with respect to FIG. 3B, UI 310 has a defined display area 314 and a user input may cause some UI elements 320 to be located outside of the defined display area 314. FIG. 4B is a flowchart illustrating an example of a process 420 implementing certain aspects relating to non-displayed UI elements in the approach to displaying a user interface on a curved visual surface in accordance with the present disclosure. At 422, a display area, such as display area 314 of FIGS. 3A and 3B, is defined for display of UI elements 320 on the curved visual surface. At operation 424, a determination is made as to whether the UI element 320 is positioned in the defined display area. If the UI element 320 is positioned in the display area, then the UI element will be rendered for display.

Note that the rotation operation positions the UI elements correctly on the curved visual surface. To curve the individual objects, a vertex shader may be added to each UI element that curves the UI element in a cylindrical manner. Such a shader may operate to adjust the z-axis coordinates of the vertices relative to the reference point 316 using a curve, and sufficient geometry will curve the UI element smoothly. For example, a geometry shader may be used to add extra vertices to flat UI elements to allow for the curve, but this may entail some performance costs.

Alternatively, meshes with a built in curve may be provided for each curved UI element to avoid the use of a shader, which is a less performance intensive solution. However, a curved mesh would need to be created for each UI element to be curved. If a curved UI element is desired, one optional operation that may be useful for larger UI elements is to apply a curve to UI element so that the UI element conforms, at least in part, to the curvature of the curved visual surface.

In accordance with one example implementation of a curvature option, at 430, a determination may be made as to whether a dimension of the UI element, e.g. width, exceeds a threshold size. If the UI element does not exceed the threshold, then the UI element is rendered in the display area on the curved visual surface at 432. If the UI element does exceed the threshold, then, at 434, the UI element is curved, e.g. through shading or a curved mesh for the UI element, and the curved UI element is rendered at 432. If, at 424, it is determined that a UI element is not positioned in the display area 314, then, at 440, the UI element is blocked from display and, at 442, the UI element is disabled from receiving user input.

Figure 4C:
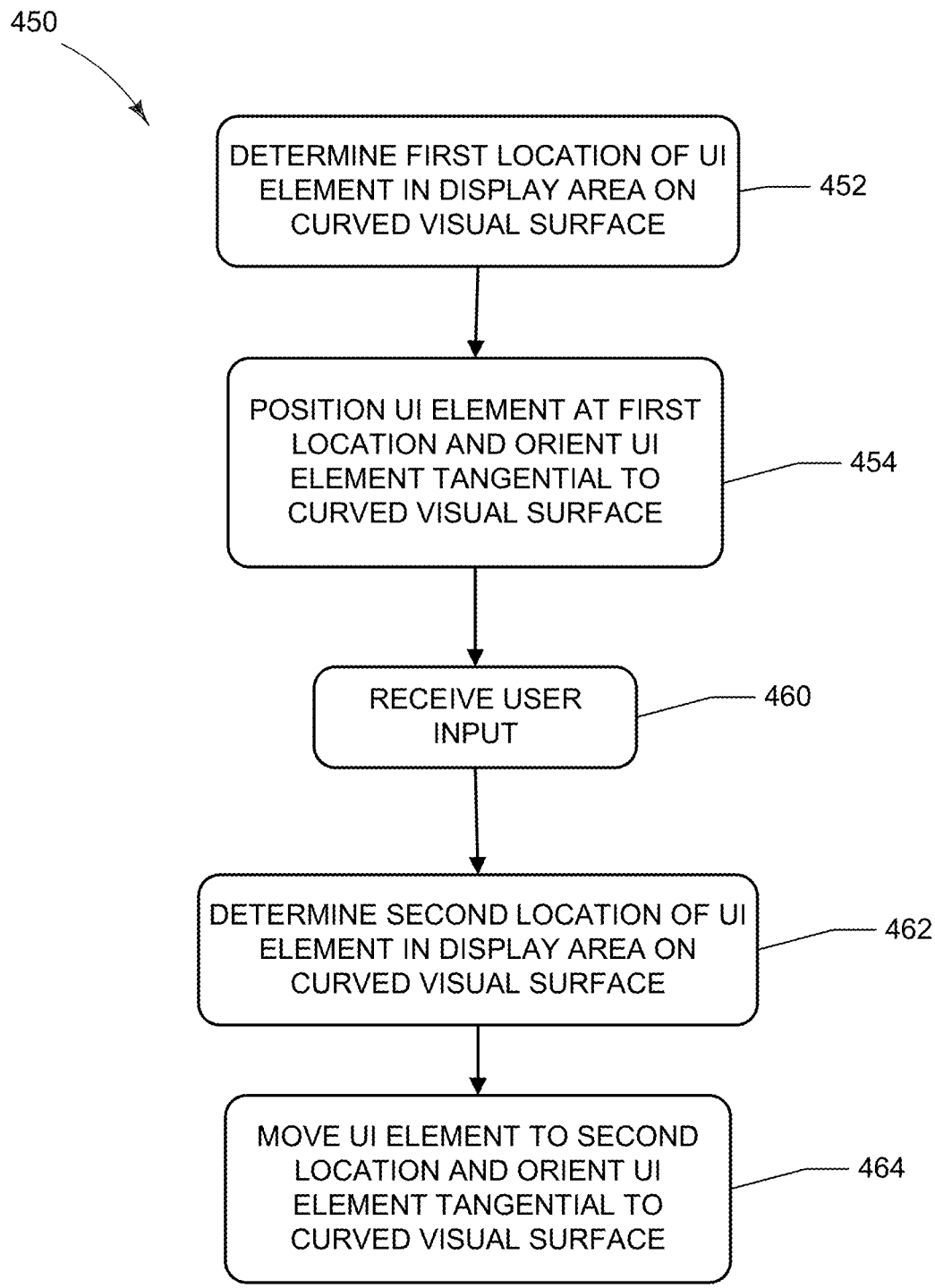
FIG. 4C is a flowchart illustrating another example of an implementation for displaying a user interface on a curved visual surface in accordance with the present disclosure.

Another implementation of one approach according to the present disclosure is to position each UI element to be displayed on a tangent to the curved visual surface. Because the curved visual surface is oriented or focused on the reference point 318 that is the likely user viewpoint, then the UI elements will also be oriented towards the reference point. FIG. 4C is a flowchart illustrating an example of a process 450 illustrating this implementation of the approach to displaying a user interface on a curved visual surface in accordance with the present disclosure.

In process 450, at operation 452, a determination is made of a first location for display of a UI element 320 in the display area 314 on the curved visual surface 122. At 454, the UI element is positioned at the first location and the UI element is oriented to be tangential to the curved visual surface. For example, the UI element may be positioned such that a line perpendicular to a plane of the UI element intersects a y-axis centered on reference point 316.

If a user input is received, at 460, that changes the location of UI elements 320 on the curved visual surface, then the UI elements may be re-oriented. At step 462, a second or target location of a UI element is determined based on the user input and, at step 464, the UI element is moved to the second or target location and oriented to be tangential to the curved visual surface.

Figure 5A:
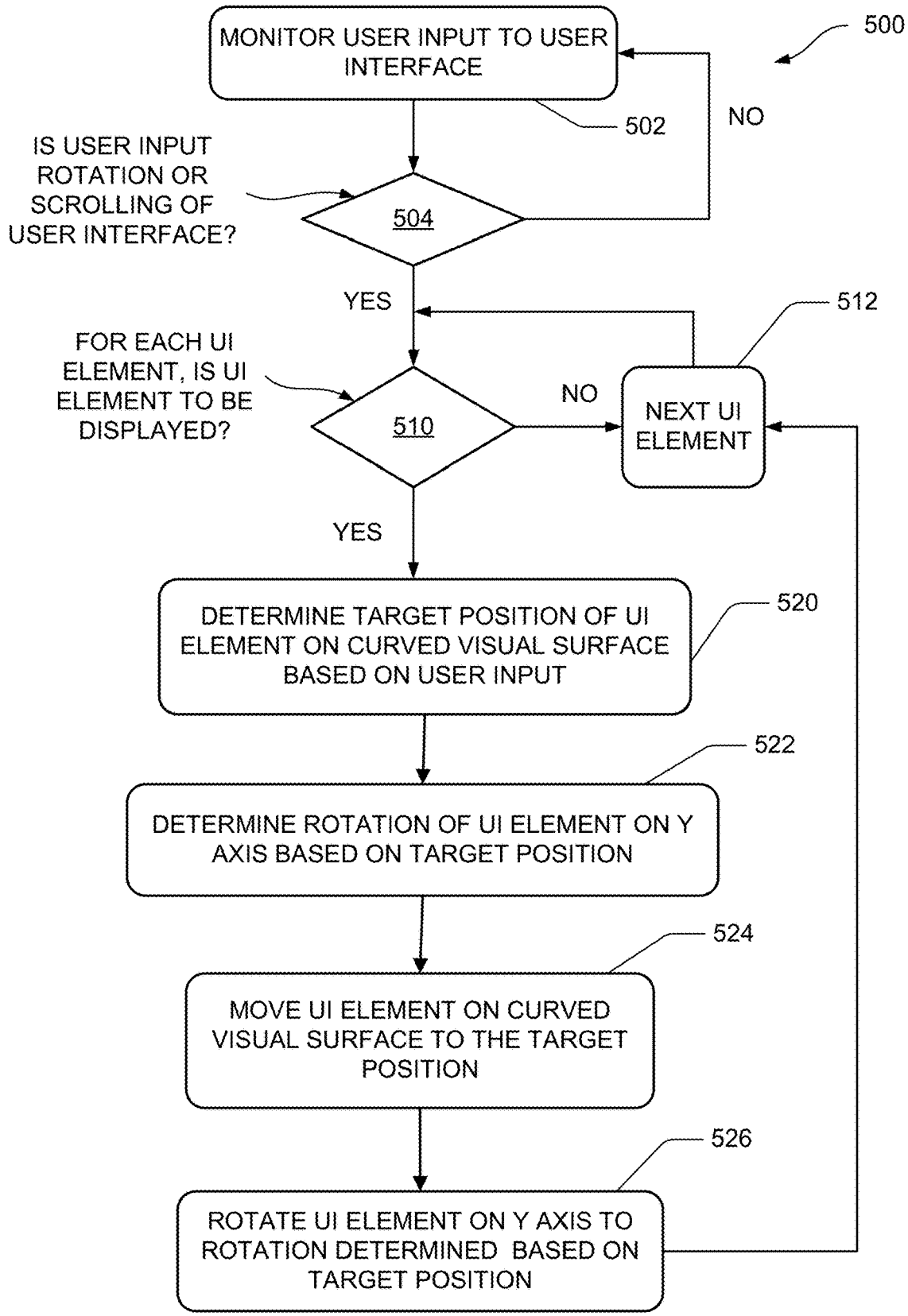
FIG. 5A is a flowchart illustrating still another example of an implementation of certain aspects relating to rotation of the user interface in accordance with the present disclosure.

As discussed above with respect to FIG. 3B, user input may be registered that represents horizontal movement of UI element 320 within display area 314 of UI 310. FIG. 5A is a flowchart illustrating an example of a process 500 implementing certain aspects relating to movement and rotation of UI elements when displaying a user interface on a curved visual surface in accordance with the present disclosure. At 502, the process monitors user input to user interface 310. If user input is detected, a determination is made at 504 as to whether the user input represents a request to rotate or scroll the user interface 310. If the user input does not request movement of UI elements, then the process returns to 502.

If the user input does represent rotation or scrolling, then a determination is made at 510 as to whether each UI element is to be displayed in the display area 314 of the UI 310. If the UI element is to be displayed, then a target position for the UI element on the curved visual plane is calculated based on the user input and an initial position of the UI element. At 522, a target position is determined for the y-axis rotation of the UI element at the target position. At 524, the UI element is moved to the target position on the curved visual surface and, at 526, the UI element is rotated to the y-axis rotation determined based on the target position. Note that operations 524 and 526 are preferably performed in a coordinated manner so that the UI element rotates as it is being moved.

To provide for a comfortable user experience, it may be preferable to apply easing functions to movement and rotation of UI elements in the three dimensional environment.

Figure 5B:
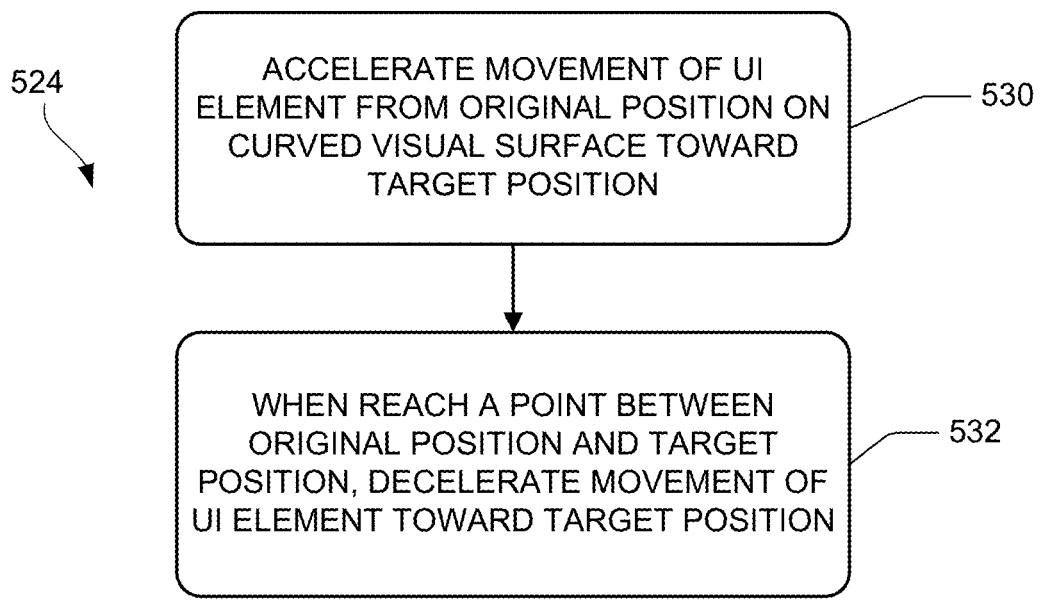
FIG. 5B is a flowchart illustrating an example of an implementation of certain aspects relating to movement of user interface elements on a curved visual surface in accordance with the present disclosure.
Figure 5C:
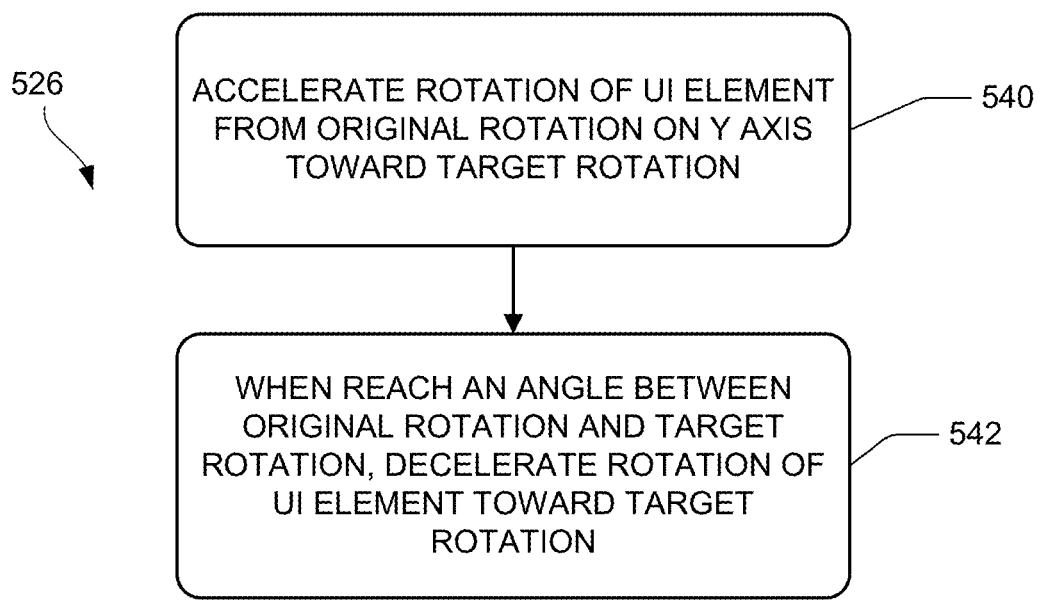
FIG. 5C is a flowchart illustrating an example of an implementation of certain aspects relating to rotation of user interface elements on a curved visual surface in accordance with the present disclosure.

FIGS. 5B and 5C are s illustrating examples of processes implementing certain aspects relating to graduated movement and rotation of UI elements in the approach to displaying a user interface on a curved visual surface in accordance with the present disclosure.

FIG. 5B represents an example of an implementation for operation 524 in FIG. 5A for movement of a UI element 320 to its target position. At 530, movement of the UI element 320 accelerates from the original or initial position of the UI element to its target position in an acceleration portion, or phase, of the movement. This acceleration portion may continue, for example, until a midpoint or other point between the initial and target positions is reached, a threshold rate of movement is achieved, or a calculated rate of movement is achieved, i.e. based on distance between the initial and target positions.

At 532, movement of the UI element 320 decelerates as the UI element approaches its target position in a deceleration portion, or phase, of the movement. The deceleration portion may begin, for example, when the UI element reaches the midpoint between the initial and target positions or a threshold distance from the target position is reached. Other threshold conditions for acceleration and deceleration of movement may be effectively employed.

FIG. 5C represents an example of an implementation for operation 526 in FIG. 5A for rotation of a UI element 320 to its target rotation. At 540, rotation of the UI element 320 accelerates from the original or initial rotation of the UI element to its target rotation in an acceleration portion or phase of the movement or rotation. This acceleration portion may continue, for example, until an angle is reached between the original rotation and target rotation, a threshold rate of rotation is achieved, a calculated rate of rotation is achieved, or until a midpoint or other point between the initial and target positions of the UI element is reached.

At 542, rotation of the UI element 320 decelerates as the UI element approaches its target position in a deceleration portion, or phase, of the movement. The deceleration portion for rotation may begin, for example, when the UI element reaches the midpoint between the initial and target positions or a threshold distance from the target position is reached. It will be readily appreciated by one of ordinary skill in the art that a variety of algorithms may be applied to accelerated and decelerate movement of the UI elements.

Figure 6:
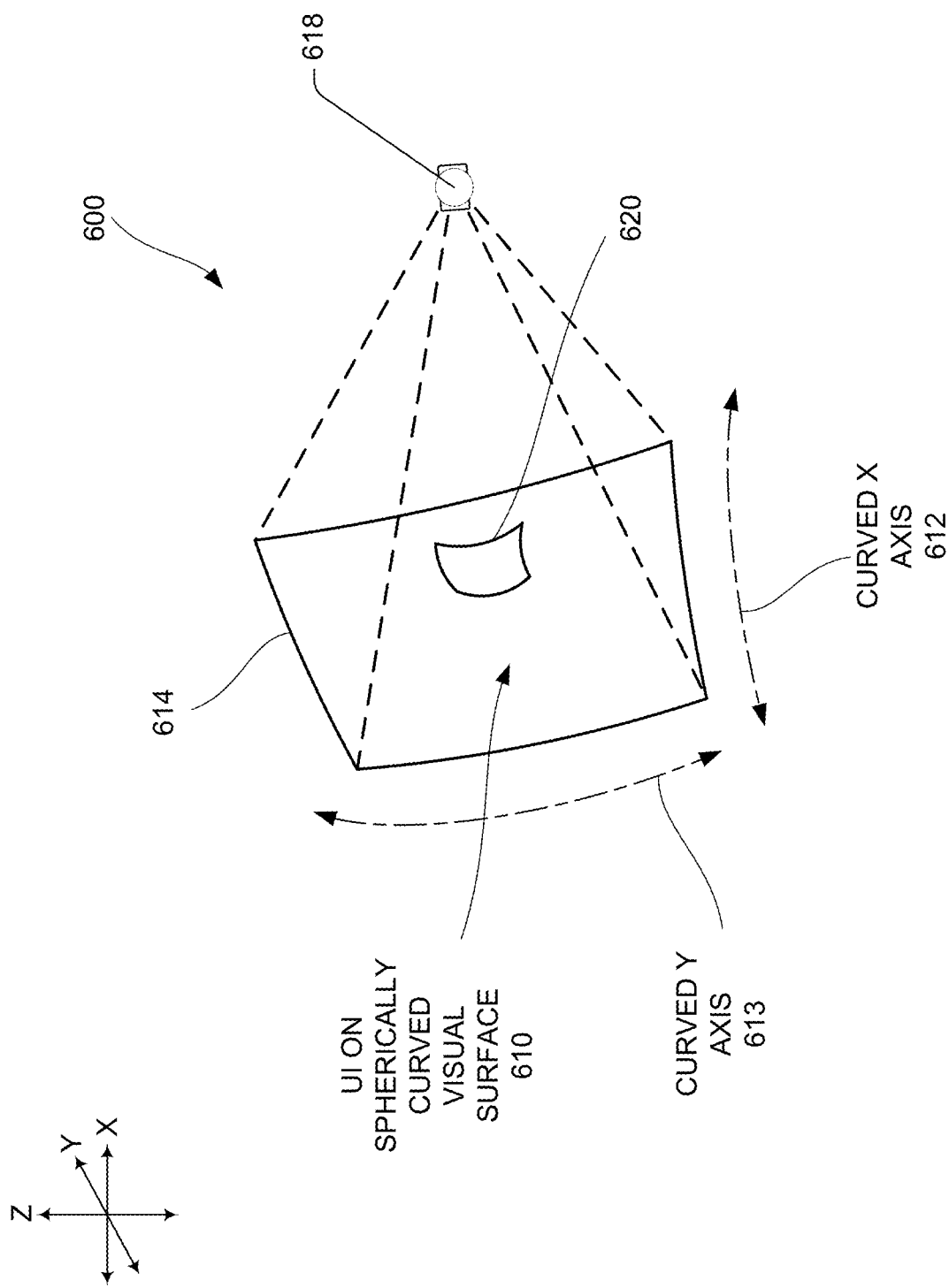
FIG. 6 is a schematic view illustrating a spherically curved visual surface upon which a user interface may be displayed and to which certain aspects of the technologies described by the present disclosure may be applied.

Though the present approach is discussed above with respect to a cylindrically curved visual surface, the present approach may be applied to a spherically curved visual surface upon which a user interface may be displayed. FIG. 6 is a schematic view illustrating a spherically curved visual surface to which certain aspects of the approach of the present disclosure may be applied. In the spherically curved three dimensional environment 600 of FIG. 6, a user interface 610 is transformed onto a spherically curved visual surface. The spherically curved visual surface has both a curved x-axis 612, a curved y-axis 613 and a reference point 618, which may be the center or focal point of the spherically curved visual surface and intended to coincide with the user view point. A UI display area 614 is defined for the UI 610 within which UI elements 620 may be displayed.

The description above relating to the operations for a cylindrically curved visual surface are readily extended to a spherically curved visual surface. For example, in addition to the rotation described for UI elements with respect to the y-axis, rotation with respect to the x-axis may also be performed. For example, determining a target rotation for the UI element around the y-axis based on the target position may further include determining an x-axis rotation of the UI element with respect to the y-axis based on the target position. Further, rotating the UI element to the target rotation may include rotating the UI element to the determined x-axis rotation. This results in the UI element 620 being oriented toward reference point 618 with respect to both the curved x-axis and curved y-axis.

Figure 7:
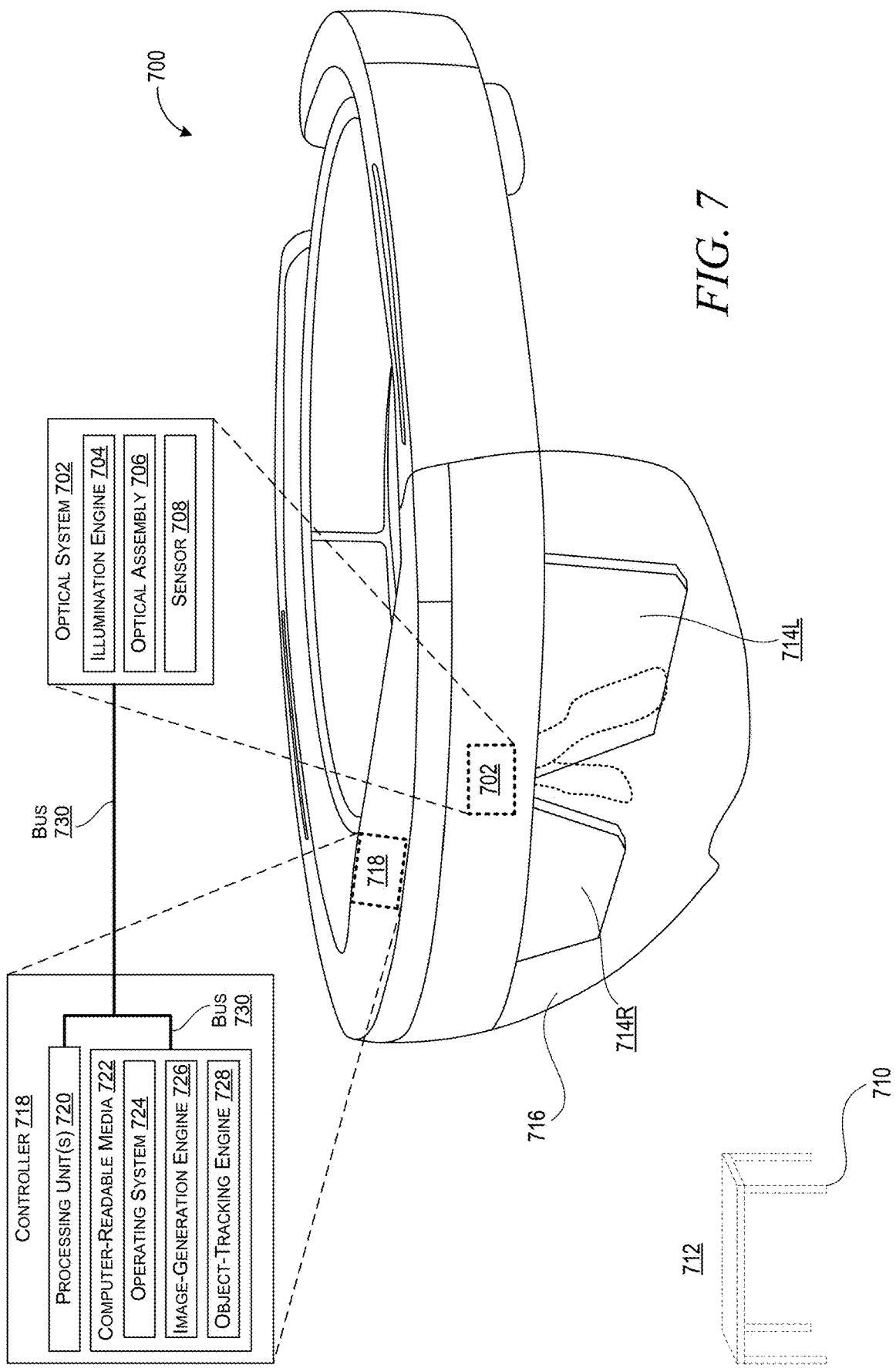
FIG. 7 is a perspective-view of an example of an implementation of a mixed reality headset suitable for applying certain aspects of the technologies described by the present disclosure.

FIG. 7 is a schematic diagram illustrating an example of a headset system that may be utilized with the approach to displaying a user interface on a curved visual surface in accordance with the present disclosure. Referring now to FIG. 7, a front-view of an example implementation of a mixed reality ("MR") headset or Near-Eye-Display ("NED") device 700 (i.e., the optical device) is shown that may be suitable for generating a curved visual surface and user interface as discussed above. In this example, device 700 incorporates an optical system 702 that includes an illumination engine 704 to generate electro-magnetic ("EM") radiation that includes both a first bandwidth for generating computer-generated ("CG") images and a second bandwidth for tracking physical objects.

The first bandwidth may include some or all of the visible-light portion of the EM spectrum whereas the second bandwidth may include any portion of the EM spectrum that is suitable to deploy a desired tracking protocol. In this example, the optical system 702 further includes an optical assembly 706 that is positioned to receive the EM radiation from the illumination engine 704 and to direct the EM radiation (or individual bandwidths of thereof) along one or more predetermined optical paths. For example, the illumination engine 704 may emit the EM radiation into the optical assembly 706 along a common optical path that is shared by both the first bandwidth and the second bandwidth. The optical assembly 706 may also include one or more optical components that are configured to separate the first bandwidth from the second bandwidth (e.g., by causing the first and second bandwidths to propagate along different image-generation and object-tracking optical paths, respectively).

The optical assembly 706 includes one or more micromechanical system ("MEMS") scanners that are configured to direct the EM radiation with respect to one or more components of the optical assembly 706 and, more specifically, to direct the first bandwidth for image-generation purposes and to direct the second bandwidth for object-tracking purposes. In this example, the optical system 702 further includes a sensor 708 to generate object data in response to a reflected-portion of the second bandwidth, i.e. a portion of the second bandwidth that is reflected off an object 710 that exists within a real-world environment 712.

In some examples, the NED device 700 may utilize the optical system 702 to generate a composite view (e.g., from a perspective of a user that is wearing the NED device 700) that includes both one or more CG images and a view of at least a portion of the real-world environment 712 that includes the object 710. For example, the optical system 702 may utilize various technologies such as, for example, AR technologies to generate composite views that include CG images superimposed over a real-world view. As such, the optical system 702 may be configured to generate CG images via a display panel 714.

In the illustrated example, the display panel 714 includes separate right eye and left eye transparent display panels, labeled 714R and 714L, respectively. In some examples, the display panel 714 may include a single transparent display panel that is viewable with both eyes and/or a single transparent display panel that is viewable by a single eye only. Therefore, it can be appreciated that the techniques described herein may be deployed within a single-eye Near Eye Display (NED) system (e.g. GOOGLE GLASS) and/or a dual-eye NED system (e.g. MICROSOFT HOLOLENS). The NED device 700 is an example device that is used to provide context and illustrate various features and aspects of the user interface display techniques and systems disclosed herein. Other devices and systems, such as VR systems, may also use the interface display techniques and systems disclosed herein.

In some examples, the display panel 714 may be a waveguide display that includes one or more diffractive optical elements ("DOEs") for in-coupling incident light into the waveguide, expanding the incident light in one or more directions for exit pupil expansion, and/or out-coupling the incident light out of the waveguide (e.g., toward a user's eye). In some examples, the NED device 700 may further include an additional see-through optical component 716, shown in FIG. 7 in the form of a transparent veil or visor 716 positioned between the real-world environment 712 (which real-world environment makes up no part of the claimed invention) and the display panel 714.

It can be appreciated that the transparent veil 716 may be included in the NED device 700 for purely aesthetic and/or protective purposes. The NED device 700 may further include various other components, for example speakers, microphones, accelerometers, gyroscopes, magnetometers, temperature sensors, touch sensors, biometric sensors, other image sensors, energy-storage components (e.g. battery), a communication facility, a GPS receiver, etc.

In the illustrated example, a controller 718 is operatively coupled to each of the illumination engine 704, the optical assembly 706 (and/or MEMS scanner(s) thereof,) and the sensor 708. The controller 718 includes one or more logic devices and one or more computer memory devices storing instructions executable by the logic device(s) to deploy functionalities described herein with relation to the optical system 702, such as the user interface examples discussed above. The controller 718 can comprise one or more processing units 720, one or more computer-readable media 722 for storing an operating system 724 and data such as, for example, image data that defines one or more CG images and/or tracking data that defines one or more object tracking protocols. The user interface, as discussed above, is one example of the CG images that may be generated by the controller 718.

The computer-readable media 722 may further include an image-generation engine 726 that generates output signals to modulate generation of the first bandwidth of EM radiation by the illumination engine 704 and also to control the MEMS scanner(s) to direct the first bandwidth within the optical assembly 706. Ultimately, the MEMS scanner(s) direct the first bandwidth through the display panel 714 to generate CG images that are perceptible to a user, such as a user interface.

The computer-readable media 722 may further include an object-tracking engine 728 that generates output signals to modulate generation of the second bandwidth of EM radiation by the illumination engine 704 and also the MEMS scanner(s) to direct the second bandwidth along an object-tracking optical path to irradiate the object 710. The object tracking engine 728 communicates with the sensor 708 to receive the object data that is generated based on the reflected-portion of the second bandwidth.

The object tracking engine 728 then analyzes the object data to determine one or more characteristics of the object 710 such as, for example, a depth of the object 710 with respect to the optical system 702, an orientation of the object 710 with respect to the optical system 702, a velocity and/or acceleration of the object 710 with respect to the optical system 702, or any other desired characteristic of the object 710. The components of the NED device 700 are operatively connected, for example, via a bus 730, which can include one or more of a system bus, a data bus, an address bus, a PCI bus, a Mini-PCI bus, and any variety of local, peripheral, and/or independent buses.

The processing unit(s) 720, can represent, for example, a CPU-type processing unit, a GPU-type processing unit, a field-programmable gate array ("FPGA"), another class of digital signal processor (DSP), or other hardware logic components that may, in some instances, be driven by a CPU. For example, and without limitation, illustrative types of hardware logic components that can be used include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As used herein, computer-readable media, such as computer-readable media 722, can store instructions executable by the processing unit(s) 720. Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. The claimed subject matter may be embodied in other ways, may include different elements or operations, and may be used in conjunction with other existing or future technologies. This description should not be interpreted as implying any particular order or arrangement among or between various operations or elements except when the order of individual operations or arrangement of elements is explicitly described.

The disclosure presented herein also includes the subject matter set forth in the following clauses.

Clause A: A computer-implemented method for presenting a user interface in a three dimensional virtual environment, the user interface having a set of user interface (UI) elements and the three dimensional virtual environment including a curved visual surface having a first curved axis, a second axis y, and a reference point, the method comprising: for at least one UI element: determining a first position for the UI element on the first curved axis of the curved visual surface and the second axis of the curved visual surface; determining a second axis rotation of the UI element with respect to the second axis based on the first position along the first curved axis, rotating the UI element on the second axis to the determined second axis rotation, and rendering the rotated UI element at the first position on the curved visual surface.

Clause B: The method of clause A, the method further comprising: detecting user input to the UI requesting movement of at least one UI element; and for the at least one UI element: determining a target position for the UI element on the curved visual surface based on the user input, determining a target rotation for the UI element around the second axis based on the target position, moving the UI element to the target position on the curved visual surface, and rotating the UI element to the target rotation.

Clause C: The method of clauses A and B, wherein: moving the UI element to the target position on the curved visual surface further comprises accelerating movement of the UI element to the target position during a first portion of the movement and decelerating movement of the UI element during a second portion of the movement; and rotating the UI element to the target rotation includes accelerating rotation of the UI element during the first portion of the movement and decelerating rotation of the UI element during the second portion of the movement.

Clause D: The method of clause A through C, the method further comprising curving the UI element along the first curved axis of the curved visual surface.

Clause E: The method of clauses A through D, wherein the curved visual surface is at least partially spherical such that the second axis is curved and wherein: determining a target rotation for the UI element around the second axis based on the target position further comprises determining a first axis rotation of the UI element with respect to the first curved axis based on the target position; and rotating the UI element to the target rotation further comprises rotating the UI element to the determined first axis rotation.

Clause F: The method of clauses A through E, further comprising: defining a display area on the curved visual surface for display of the UI elements; preventing display of the UI elements not positioned within the display area; and disabling the UI elements not positioned within the display area.

Clause G: The method of clauses A through F, wherein the at least one UI element includes a visual component and a collider component.

Clause H: A computer-implemented method for presenting a user interface (UI) in a three dimensional virtual environment, the method comprising: positioning one or more UI elements at first locations on a curved surface in the virtual environment, the one or more UI elements being tangential to the curved surface, the curved surface being defined by a first distance to a reference point; for at least one of the one or more UI elements: computing a second location for the UI element on the curved surface, and moving the UI element to the second location on the curved surface.

Clause I: The method of Clause H, wherein the positioning one or more UI elements at first locations on a curved surface in the virtual environment further comprises: for at least one UI element: determining the first location for the UI element on a first curved axis of the curved visual surface and a second axis of the curved visual surface; determining a second axis rotation of the UI element with respect to the second axis based on the first location along the first curved axis, rotating the UI element on the second axis to the determined second axis rotation, and rendering the rotated UI element at the first location on the curved visual surface.

Clause J: The method of Clauses H and I, wherein: computing a second location for the UI element on the curved surface further comprises determining the second location for the UI element on the curved visual surface based on a user input and computing a target rotation for the UI element based on the second location; and moving the UI element to the second location on the curved surface further comprises rotating the UI element to the target rotation.

Clause K: The method of Clauses H through J, wherein: moving the UI element to the second location on the curved visual surface further comprises accelerating movement of the UI element to the second location during a first portion of the movement and decelerating movement of the UI element during a second portion of the movement; and rotating the UI element to the target rotation includes accelerating rotation of the UI element during the first portion of the movement and decelerating rotation of the UI element during the second portion of the movement.

Clause L: The method of Clauses H through K, wherein the curved visual surface is at least partially spherical and wherein: computing a target rotation for the UI element based on the second location further comprises: determining a first axis target rotation of the UI element with respect to a first curved axis of the curved surface based on the second location, and determining a second axis target rotation of the UI element with respect to a second curved axis of the curved surface based on the second location; and rotating the UI element to the target rotation further comprises rotating the UI element to the first axis target rotation and rotating the UI element to the second axis target rotation.

Clause M: The method of Clauses H through L, the method further comprising curving the UI element along the first curved axis of the curved visual surface.

Clause N: The method of Clause H through M, further comprising: defining a display area on the curved visual surface for display of the UI elements; preventing display of the UI elements not positioned within the display area; and disabling the UI elements not positioned within the display area.

Clause O: The method of Clauses H through N, wherein at least one UI element includes a visual component and a collider component.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example, or examples, selected are chosen and described in order to best explain the principles of the examples, the practical application, and to enable others of ordinary skill in the art to understand the disclosure for various examples with various modifications as are suited to the particular use contemplated.

What is claimed is:

1. A computer-implemented method for presenting a user interface in a three-dimensional virtual environment, the user interface having a set of user interface (UI) elements, and the three-dimensional virtual environment including a curved visual surface having a first curved axis, a second axis, and a focal point, the method comprising:
   for at least one UI element:
      determining a first position for the UI element on the first curved axis of the curved visual surface and the second axis of the curved visual surface;
      determining a second axis rotation of the UI element with respect to the second axis comprising determining an angle between the focal point of the curved visual surface and a position for a central portion of the UI on the first curved axis of the curved visual surface and the focal point of the curved visual surface and the first position for the UI element on the first curved axis of the curved visual surface;
      rotating the UI element on the second axis based on the determined angle; and
      rendering the rotated UI element at the first position on the curved visual surface.

2. The computer-implemented method of claim 1, the method further comprising: detecting user input to the UI requesting movement of at least one UI element; and
   for the at least one UI element:
      determining a target position for the UI element on the curved visual surface based on the user input,
      determining a target rotation for the UI element around the second axis based on the target position,
      moving the UI element to the target position on the curved visual surface, and
      rotating the UI element to the target rotation.

3. The computer-implemented method of claim 2, wherein:
   moving the UI element to the target position on the curved visual surface further comprises accelerating movement of the UI element to the target position during a first portion of the movement and decelerating movement of the UI element during a second portion of the movement; and
   rotating the UI element to the target rotation includes accelerating rotation of the UI element during the first portion of the movement and decelerating rotation of the UI element during the second portion of the movement.

4. The computer-implemented method of claim 2, wherein the curved visual surface is at least partially spherical such that the second axis is curved;
   determining a target rotation for the UI element around the second axis based on the target position;

determining a first axis rotation of the UI element with respect to the first curved axis based on the target position; and rotating the UI element to the target rotation, wherein the rotating the UI element to the determined first axis rotation.

5. The computer-implemented method of claim 1, the method further comprising curving the UI element along the first curved axis of the curved visual surface.

6. The computer-implemented method of claim 1, further comprising:

defining a display area on the curved visual surface for display of the UI elements;

preventing display of the UI elements not positioned within the display area; and disabling the UI elements not positioned within the display area.

7. The computer-implemented method of claim 1, wherein the at least one UI element includes a visual component and a collider component.

8. A computer-implemented method for presenting a user interface (UI) in a three-dimensional virtual environment, the method comprising:

positioning one or more UI elements at first locations on a curved surface in the virtual environment;

for at least one of the one or more UI elements:

determining a first location for the UI element on a first curved axis of the curved surface and a second axis of the curved surface;

determining a second axis rotation of the UI element with respect to the second axis comprising determining an angle between a focal point of the curved surface and a position of an intersection of the second axis of the UI element with the first curved axis of the curved surface and the focal point of the curved surface and a position of an intersection of an adjusted second axis of an adjusted UI element with the first curved axis of the curved surface;

rotating the UI element on the second axis based on the determined angle;

rendering the rotated UI element at the first location on the curved surface;

computing a second location for the UI element on the curved surface; and moving the UI element to the second location on the curved surface.

9. The computer-implemented method of claim 8, wherein:

computing a second location for the UI element on the curved surface further comprises determining the second location for the UI element on the curved surface based on a user input and computing a target rotation for the UI element based on the second location; and moving the UI element to the second location on the curved surface further comprises rotating the UI element to the target rotation.

10. The computer-implemented method of claim 9, wherein:

moving the UI element to the second location on the curved surface further comprises accelerating movement of the UI element to the second location during a first portion of the movement and decelerating movement of the UI element during a second portion of the movement; and rotating the UI element to the target rotation includes accelerating rotation of the UI element during the first portion of the movement and decelerating rotation of the UI element during the second portion of the movement.

11. The computer-implemented method of claim 9, wherein the curved visual surface is at least partially spherical and wherein:

computing a target rotation for the UI element based on the second location further comprises:

determining a first axis target rotation of the UI element with respect to the first curved axis of the curved surface based on the second location, and determining a second axis target rotation of the UI element with respect to a second curved axis of the curved surface based on the second location; and rotating the UI element to the target rotation further comprises rotating the UI element to the first axis target rotation and rotating the UI element to the second axis target rotation.

12. The computer-implemented method of claim 8, further comprising curving the UI element along the first curved axis of the curved surface.

13. The computer-implemented method of claim 8, further comprising:

defining a display area on the curved surface for display of the UI elements;

preventing display of the UI elements not positioned within the display area; and disabling the UI elements not positioned within the display area.

14. The computer-implemented method of claim 8, wherein at least one UI element includes a visual component and a collider component.

15. The computer-implemented method of claim 8, wherein:

the focal point of the curved surface is associated with a viewing point of a user.

16. A system for presenting a user interface (UI) in a three-dimensional virtual environment, the system comprising:

a processor;

a display; and a memory in communication with the processor, the memory having computer-readable instructions stored thereupon that, when executed by the processor, cause the processor to:

position one or more UI elements at first locations on a curved surface in the virtual environment;

for at least one of the one or more UI elements:

determining a first location for the UI element on a first curved axis of the curved surface and a second axis of the curved surface;

determining a second axis rotation of the UI element with respect to the second axis comprising determining an angle between a focal point of the curved surface and a position for a central portion of the UI on the first curved axis of the curved surface and the focal point of the curved surface and a position at the first location for the UI element on the first curved axis of the curved surface;

rotating the UI element on the second axis based on the determined angle;

rendering the rotated UI element at the first location on the curved surface;

computing a second location for the UI element on the curved surface; and moving the UI element to the second location on the curved surface.

17. The system of claim 16, wherein:
computing a second location for the UI element on the curved surface further comprises determining the second location for the UI element on the curved surface based on a user input and computing a target rotation for the UI element based on the second location; and
moving the UI element to the second location on the curved surface further includes rotating the UI element to the target rotation.

18. The system of claim 17, wherein the curved surface is at least partially spherical and wherein:
computing a target rotation for the UI element based on the second location further comprises:
determining a first axis target rotation of the UI element with respect to the first curved axis of the curved surface based on the second location, and
determining a second axis target rotation of the UI element with respect to a second curved axis of the curved surface based on the second location; and
rotating the UI element to the target rotation further comprises rotating the UI element to the first axis target rotation and rotating the UI element to the second axis target rotation.

19. The system of claim 16, wherein at least one UI element includes a visual component and a collider component.

* * * * *